June 10, 1930.   H. G. TRENCH   1,763,110
SPRING SHACKLE
Filed Jan. 18, 1926   3 Sheets-Sheet 2
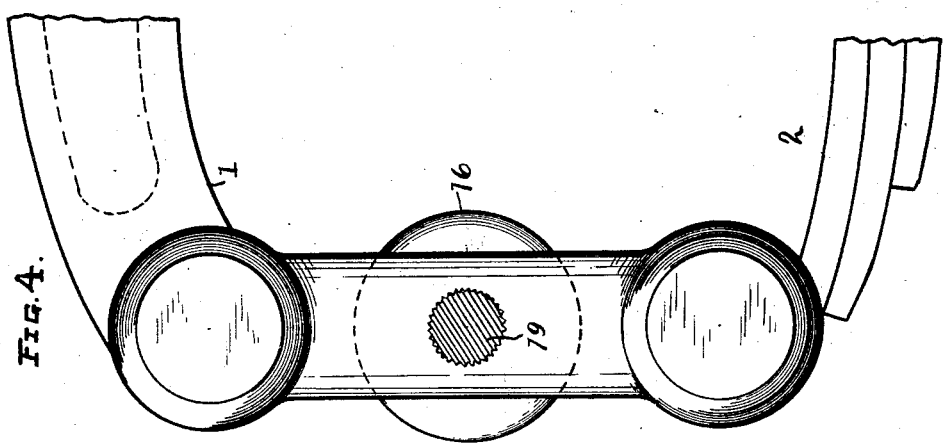
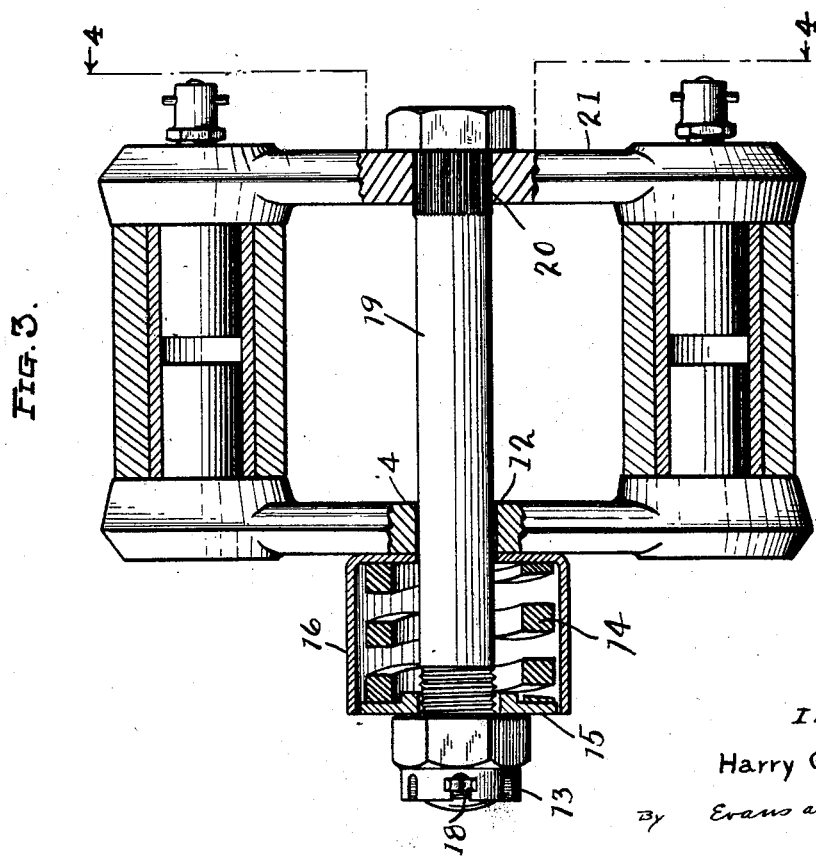
INVENTOR
Harry G. Trench
By Evans and McCoy
ATTORNEYS June 10, 1930.  H. G. TRENCH  1,763,110
SPRING SHACKLE
Filed Jan. 18, 1926   3 Sheets-Sheet 3
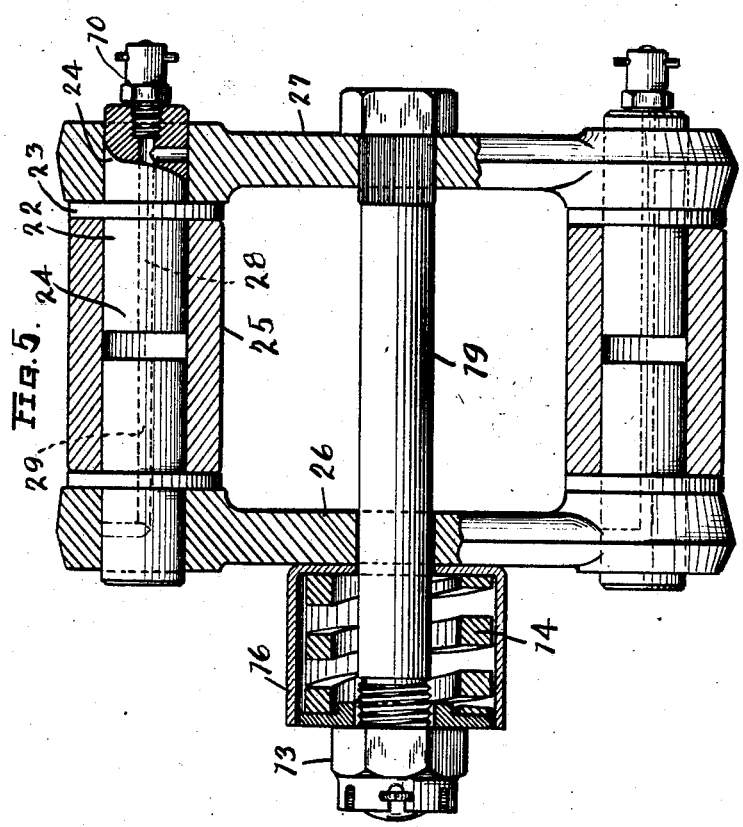
INVENTOR
Harry G. Trench
by Evans and McCoy
ATTORNEYS.

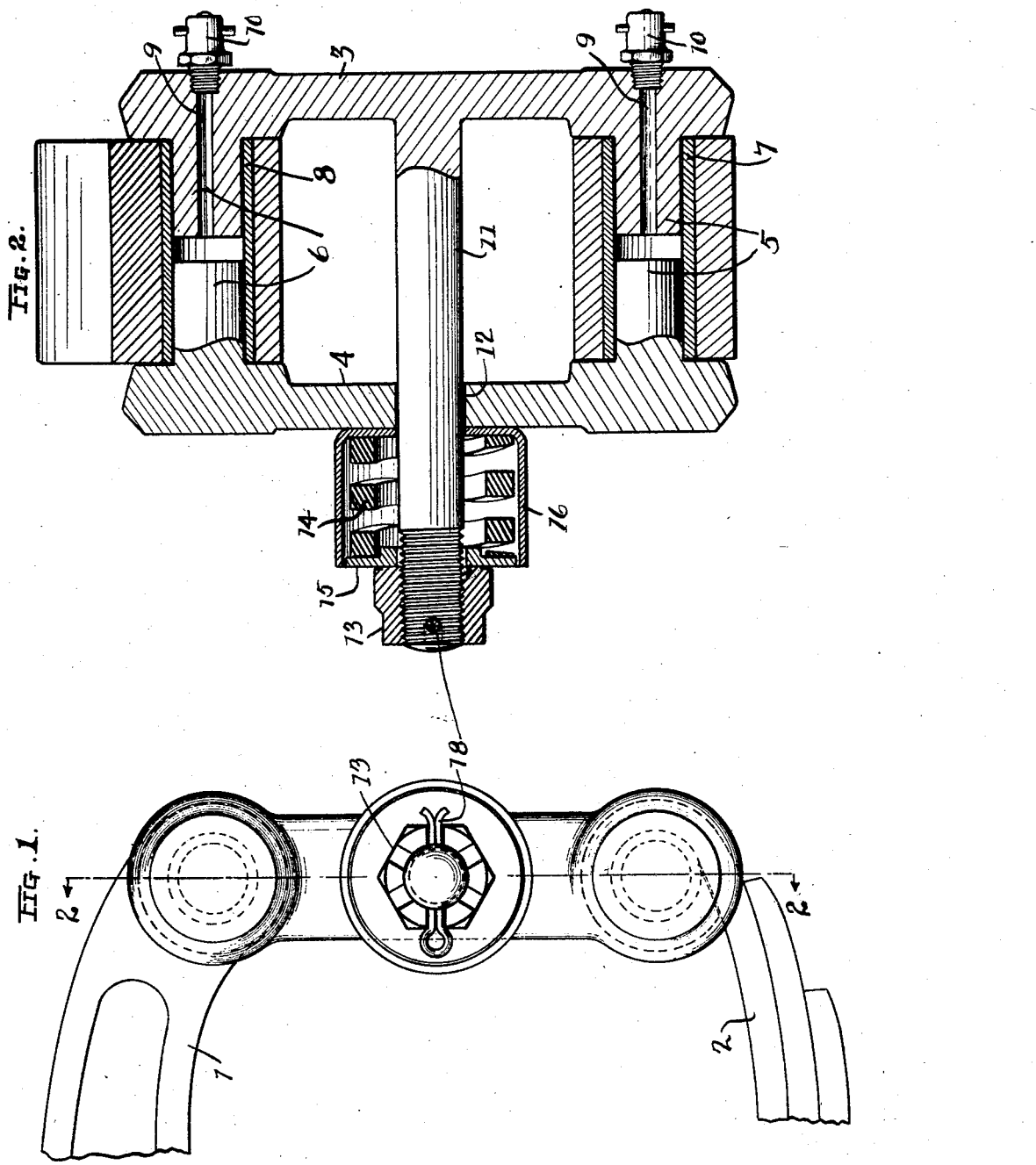

Patented June 10, 1930

1,763,110

UNITED STATES PATENT OFFICE

HARRY G. TRENCH, OF HARTFORD, CONNECTICUT, ASSIGNOR TO THE UNION TRUST COMPANY, OF CLEVELAND, OHIO, A CORPORATION OF OHIO

SPRING SHACKLE

Application filed January 18, 1926. Serial No. 81,947.

This invention relates to shackles for vehicle springs, and more particularly to a form of shackling unit that is an improvement over the constructions described in my Patent No. 1,042,173 that issued on October 20, 1912.

Constructions of this character are employed for connecting vehicle springs with the vehicle chassis in such manner as to permit relative movement between the end of the spring and the vehicle frame. The shackling unit herein described is primarily adapted to permit movement of the end of the spring relative to the vehicle frame, both in a longitudinal and lateral direction, while yieldingly restraining such movement, and to dampen relative motion of the spring, in order to prevent rattling or slapping of the shackling mechanism during operation of the vehicle.

One of the objects of this invention is to provide an improved form of shackling unit embodying the characteristic advantages of my previously proposed shackling unit, which shall be more easily assembled and shall have a single adjusting mechanism for regulating the degree of pressure applied by the shackle plates to the head of the vehicle spring and to the portion of the frame that carries the shackling unit.

An additional object of my invention is to provide a mechanism that may be manufactured at less cost than the mechanism heretofore proposed.

A further object of my invention is to provide a shackle assembly that is secured in operative position by a single adjusting nut and also constitutes means for adjusting the pressure exerted on the shackle plates.

Another object of the invention is to provide a shackle unit that is intended to be used without bushings in the vehicle spring head and frame support.

These and other objects will be apparent from a study of the accompanying drawings, wherein:

Figure 1 is a side elevational view, with parts broken away, of a shackle unit connecting a vehicle frame with one end of a suitable vehicle spring;

Fig. 2 is a cross sectional view taken substantially on line 2—2 of Fig. 1;

Fig. 3 is a sectional view, corresponding to the view shown in Fig. 2, of a modified form of my invention;

Fig. 4 is a side elevational view of the modified form of shackle unit shown in Fig. 3;

Fig. 5 is a side elevational view, shown partially in section and partially in elevation, of a further modification of the shackle unit shown in Fig. 3;

The shackle unit shown in Figure 1 is used to connect a vehicle frame portion 1 with one end of a vehicle supporting spring 2, the vehicle parts being broken away close to the shackle unit because they constitute no part of my present invention and serve only to illustrate the mounting of the shackle unit on any desired form of vehicle.

The shackle unit shown in Figs. 1 and 2 comprises, together with other elements, a pair of spaced shackle plates 3 and 4. Pintles 5 and 6, that are carried by the ends of the shackle plates, serve to pivotally connect the head of the spring 2 with the frame portion 1. The head of the vehicle spring 2 has a spring bushing 7 that constitutes a bearing surface for the pintle elements 5. The frame portion 1 has a corresponding bushing 8 that receives the pintle elements 6.

In this particular application of my invention, pintles 5 and 6 are shown as formed integrally with the shackle plates. The pintle elements carried by the shackle plate 3 have a lubricant channel 9 formed therein that connects with a lubricating head 10 through which suitable grease or other lubricant is supplied to the bearing faces of the shackle unit.

The shackle plate 3 also carries an assembly bolt 11 that extends through a suitable aperture 12 that is formed in the shackle plate 4 and that permits relative lateral movement of the shackle plates 3 and 4. The outer end of the assembly bolt 11 preferably has a castellated adjusting nut 13 that applies pressure to a helical spring 14 through a suitable spring seat 15 that seats against the clamping face of the nut. The spring 14 is carried in a spring-protecting cup 16 having an aperture in its spring seating portion to receive the bolt 11 that extends therethrough. The cup 16 also has cylindrical side walls that, together with the spring seat 15, constitute a housing for the spring 14. The spring seat 15 snugly fits within the cylindrical portion of the cup 16 wherein it is capable of moving into and out of the cup in response to flexing of the spring 14. The seat 15 and the cup 16 together constitute a dust excluding pocket for carrying the spring 14. The bolt 11 has an aperture extending transversely therethrough near its outer end for receiving a suitable cotter pin 18 that retains the castellated nut 13 in its adjusted positions.

The operation of this shackle unit on a vehicle is substantially the same as the operation of the shackle units described in my aforesaid application. The application of the spring pressure to the central portion of the shackle plate 4, and the transmission of the spring pressure through the bolt 11 to the shackle plate 3, maintains the desired degree of yielding pressure on the shackle plates to effectively minimize any objectionable rattle or looseness in the shackle units and to provide the proper degree of frictional resistance to the operation of the vehicle supporting spring 2.

The shackle unit shown in Fig. 3 and Fig. 4 differs only from the unit shown in Fig. 1 and Fig. 2 in the use of a separate assembly bolt 19 that is mounted in a suitably formed aperture 20 in shackle plate 21 that replaces shackle plate 3 shown in Fig. 2. Otherwise, this unit is substantially the same as the unit shown and described in connection with Figs. 1 and 2.

The modified form of shackle unit shown in Fig. 5 includes separable pintle elements 22, each of which has a collar or flange 23 that is interposed between the bearing portions 24, that are respectively adapted to be received in the supporting frame portion 25 and in suitable apertures formed in the respective shackle plates 26 and 27. One of the pintle elements has a lubricant supply unit 10 mounted in the end thereof which communicates with a lubricant channel 28. The other pintle element has a corresponding lubricating channel 29 that conveys lubricating material to the bearing portions thereof. The flanged portions of the pintle elements seat against the side faces of the head of the spring, to thereby maintain the pintle elements in alignment with the corresponding bushings.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A shackle unit for use in connection with vehicle springs comprising a shackle plate having apertures in the end portions thereof, a pintle element having an annular flange formed intermediate its ends and having a portion adapted to be received in the aperture of one end of said shackle plate, a second portion adapted to provide a pivot element for the vehicle spring in connection with which said shackle unit is used, a second pintle of like construction secured in the aperture formed in the other end of said shackle plate, a second shackle plate, a bolt carried by the first shackle plate and extending through an aperture formed in said second shackle plate, pintle elements carried in suitable apertures formed in the end portions of said second shackle plate, a helical spring mounted concentrically of the end portion of said bolt, a nut mounted on the end of said bolt and adapted to apply adjustable pressure to said spring, said spring being mounted between said second shackle plate and said nut and adapted to impose yielding pressure on the end portions of said shackle plates, urging the end portions of said shackle plates toward each other when said shackle unit is mounted in position.

2. A shackle unit for use in connection with vehicle springs, comprising shackle plates having apertures in the end portions thereof, pintle elements each having an annular flange intermediate its ends, one end portion of each pintle fitting into an aperture formed in the shackle plate, the opposite end portions of the pintle elements providing pivots for engagement in openings in vehicle spring and frame members, and an assembly bolt connecting the shackle plates intermediate their ends.

In testimony whereof I affix my signature.

HARRY G. TRENCH.